United States Patent Office 3,113,939
Patented Dec. 10, 1963

3,113,939
SUBSTITUTED MALEIC ANHYDRIDES AND THE CORRESPONDING LACTONES OF 3-FORMYL-ACRYLIC ACID
Elmore L. Martin, Wilmington, Del., assignor to E. I. du Pont de Nemours and Company, Wilmington, Del., a corporation of Delaware
No Drawing. Filed May 28, 1959, Ser. No. 816,382
8 Claims. (Cl. 260—240)

This invention is concerned with a new class of dyes and more particularly with substituted maleic anhydrides and the corresponding lactones of 3-formylacrylic acid.

In dye chemistry it is desirable to have available a class of chemically related compounds which, by variation within the class, can provide a broad range of colors. Such a class has the advantage that the several members may be applied by similar dyeing techniques, and thus a whole family of colors may be made available with a minimum of application variations. This invention is concerned with a new class of dyes, the colors of which cover substantially the entire range of the visible spectrum.

There has now been discovered a new class of dyes of the formula $$Q-C=C-Y$$
$$\underset{Z}{|}\underset{O}{\diagdown}\underset{C=O}{|}$$

wherein Z is a member of the class consisting of $$\overset{|}{C}=O \text{ and } H\overset{|}{C}OH$$

groups; Y is a member of the class consisting of —CN, —COOR, —COR, —CONR$_2$, —CSNR$_2$, —SO$_2$R and —NO$_2$ radicals; R is a member of the class consisting of hydrogen and hydrocarbyl radicals, and Q is R'$_2$NAr—, RCONHNRAr—, RCH=NNRAr—, $$R_2N-N=CH-(CH=CH)_nAr$$

(R'$_2$NAr)$_2$C=CH—, YY'CH—

$$\begin{array}{c} O \\ \| \\ R'N-C \\ | \quad \diagdown \\ \quad \quad CH- \\ N=C \\ | \\ R \end{array}$$

and $$\begin{array}{c} Y''' \quad R'' \\ RO-\!\!\!\!\!\!\!\!\!\!\!\!\!\!\!\!\!\!\!\!\!\!\!-\!\!\!\!\!\!\!\!\!\!\!\!\!\!\!\!- \\ Y'' \quad R \end{array}$$

in which Ar is arylene; R is as defined above; R" is hydrogen or hydrocarbyl; and R' is hydrocarbyl, β-alkoxyethyl, β-acyloxyethyl, β-cyanoethyl or β-trialkylammoniumethyl; Y and Y' are —CN, —COOR, —COR, —CONR$_2$, —CSNR$_2$, —SO$_2$R, and —NO$_2$; Y''' is alkyl, halogen, —SO$_3$Na or Y; Y'''' is hydrogen or Y'', with the proviso that Y''' and R'' taken together may form another aryl ring; and $n$ is 0 or 1. It is to be understood that in a given compound the several embodiments of R and R' that may be involved may be the same or different, respectively.

These dyes are prepared by the reaction indicated in the following equation:

$$X-C=C-Y \qquad Q-C=C-Y$$
$$\underset{Z}{|}\underset{O}{\diagdown}\underset{C=O}{|} + QH \longrightarrow \underset{Z}{|}\underset{O}{\diagdown}\underset{C=O}{|} + HX$$

where X is halogen, particularly fluoro, chloro, or bromo, and Q, Y, and Z are as defined above.

In this process it is not necessary to isolate the starting material $$X-C=C-Y$$
$$\underset{Z}{|}\underset{O}{\diagdown}\underset{C=O}{|}$$

prior to carrying out the reaction. As illustrated in Example I, it may be obtained in situ from the corresponding dihalogen compound $$X-C=C-X$$
$$\underset{Z}{|}\underset{O}{\diagdown}\underset{C=O}{|}$$

where X and Z are as defined above.

By arylene I mean generically any divalent aromatic radical. It is of the essence of an arylene radical that the two bonds stem from different ring carbon atoms. Among arylene radicals are included those from which the corresponding aromatic compound obtained by placing hydrogens at the respective bonds of the arylene group has a resonance energy of not less than 20 kcal./mole. Resonance energies of organic compounds and the determination of resonance energies are shown by Linus Pauling in "The Nature of the Chemical Bond," second edition, Cornell University Press, 1945, pages 132–139.

Arylene groups particularly suitable in the compounds of this invention include phenylene, naphthylene, anthrylene, furylene, thienylene, and pyrrolylene.

By the term "hydrocarbyl," used in defining the products and process of this invention, I means any monovalent organic radical composed solely of carbon and hydrogen. I use it in its full generic sense. The wide variation in the hydrocarbyl groups used in the illustrations which follow makes it evident that all hydrocarbyl groups are operable. Hydrocarbyl groups may vary as to whether they are saturated, unsaturated, alkyl, cycloalkyl, aryl, aralkyl, alkaryl, single ring, multi ring, straight chain, branched chain, large, small, and the like. The widest variation of this sort does not in any way detract from the fundamental characteristic of the hydrocarbyl radical of passing unchanged through the process of this invention and exercising no effect whatever on the chemical steps of the process.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polyisoprene, polystyrene, and the like, are fully operable.

It is obvious that hydrocarbyl groups containing 20 or fewer carbon atoms are most available, and to that extent preferred. But there is to be no question of the operability of, or of the intent to include and disclose, any hydrocarbyl group whatsoever. Except for factors of bulk and dilution, wide variations in size and structure of hydrocarbyl radicals have no effect on the color of the dyes to which they are attached. All dyes of this invention obtainable by variation of hydrocarbyl groups within the above definitions are hereby disclosed. Routineering to disclose each and every possible hydrocarbyl embodiment is superfluous.

As indicated by the wide variations in the examples, there are no process variables which appear critical. As shown in the examples, it suffices to bring the reactants together and no auxiliary materials are required.

It is convenient, although not essential, to employ as a reaction medium an organic solvent which is inert to the reactants and products. Thus, there may be employed aliphatic or aromatic hydrocarbons, dialkyl ethers, cyclic ethers, such as dioxane and tetrahydrofuran, esters, N,N - dimethylformamide, N,N - diethylformamide, N-methylformanilide, N-methylformamide, formamide, N-methyl-N-ethylacetamide, N,N-dimethylacetamide, N,N-diethylacetamide, tetramethylurea, tetraethylurea, pyridine, dimethylsulfoxide, acetonitrile, N-nitrosodimethylamine, 2,2,2-trifluoroethanol, and mixtures of these liquids. Amides are the preferred class of solvents. Since the reaction of this process is mildly exothermic, the use of an inert reaction medium facilitates dissipation of the heat of reaction.

The temperature at which the reaction of this invention is carried out may be varied widely, for example, from temperatures below 0° C. up to the decomposition temperature of the reactants or products. In general, however, it is preferred to operate in the range of 0–200° C., and best yields are obtained when operating in the range of 20–100° C.

The reaction of a compound

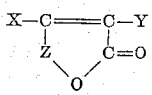

with a compound QH according to this invention takes place between equimolecular quantities of the reactants. However, this in no way limits the molar proportions of these reactants which may be brought together within the limits of the process. The relative amounts may be varied widely, for example, from molar ratios of 19:1 to 1:19. However, highest yields are obtained when approximately equimolar quantities are employed.

Pressure is not a critical variable in this process, and atmospheric pressure is ordinarily preferred for convenience, although pressures above or below atmospheric are operable.

In the following examples parts are by weight unless otherwise indicated. Example I represents a preferred embodiment of the invention.

EXAMPLE I

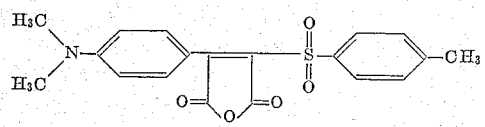

A solution of dichloromaleic anyhdride (167 parts) in dimethylformamide (1417 parts) is prepared by stirring and warming at about 80° C. The solution is cooled to 15° C. and 240 parts of dimethylaniline is added, followed by the addition of 178 parts of sodium p-toluenesulfinate in small portions. The latter addition is carried out at 20–25° C. The reaction mixture turns a deep purple, after which it is allowed to react for five minutes at 20–30° C. The reaction mixture is diluted with a large volume of water and a solid dye collected on a filter and washed with cold water. The dye is then washed with petroleum ether. The dye is dissolved in methylene chloride, separated from water, and dried over magnesium sulfate. The dye solution is filtered from the drying agent and concentrated to small volume by warming. The addition of petroleum ether and continued concentration precipitates a crystalline dye. This is collected, washed with petroleum ether, and redissolved in methylene chloride. The above purification steps are repeated and the crystalline dye is finally precipitated from the methylene chloride solution by addition of diethyl ether. The crystalline dye is then air-dried and finally dried over phosphorus pentoxide in a desiccator. This yields 80 parts of pure 2-(p-N,N-dimethylaminophenyl) - 3 - (p - tolylsulfonyl) - maleic anhydride. This dye has an absorption maximum at 552 millimicrons with a molecular extinction coefficient of 30,800. The dye melts at 181–183° C. The compound dyes cellulose acetate fibers a light yellow and dyes nylon, silk, and wool shades of brown.

*Analysis.*—Calcd. for $C_{19}H_{17}O_5NS$: C, 61.43; H, 4.62; N, 3.77. Found: C, 61.87; H, 4.80; N, 3.84.

EXAMPLE II

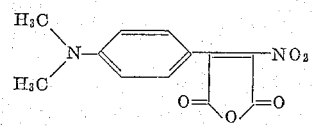

A solution of 334 parts of dichloromaleic anhydride in 1890 parts of dimethylformamide is prepared and treated with 500 parts of N,N-dimethylaniline. The mixture is cooled in an ice bath and treated with 280 parts of sodium nitrite. This mixture is stirred for one hour in an ice bath, after which the reaction mixture is diluted with water. Petroleum ether is added and the crude product is filtered, washed with water, petroleum ether, and ether in turn. This yields 2-(p-N,N-dimethylaminophenyl)-3-nitromaleic anhydride in the form of a nearly black solid, soluble in acetone and methanol to give a blue-green solution. The crude dye is dissolved in acetone at room temperature and precipitated by the addition of cold water. The purified dye is collected on the filter and dried in vacuum over phosphorus pentoxide. An acetone solution is not bleached on treatment with aqueous potassium hydroxide and heating to boiling. Acidification with acetic acid solution causes no noticeable change in the dye. This dye has absorption maxima at 970, 735, 410, and 315 millimicrons with molecular extinction coefficients at 6,570, 26,600, 6,300, and 8,660 respectively.

EXAMPLE III

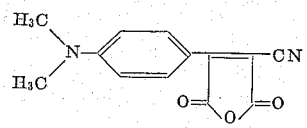

A mixture of 270 parts of silver cyanide, 100 parts of sodium cyanide, and 167 parts of dichloromaleic anhydride in 945 parts of dimethylformamide is heated at 80–100° C. The reaction mixture is treated with 360 parts of N,N-dimethylaniline to convert the intermediate dicyanomaleic anhydride and/or chlorocyanomaleic anhydride to a dye. The reaction mixture turns purple, showing the formation of 2-cyano-3-(p-N,N-dimethylaminophenyl)maleic anhydride.

EXAMPLE IV

A solution of sodium-silver cyanide is prepared in 1890 parts of dimethylformamide by dissolving 133 parts of silver cyanide and 49 parts of sodium cyanide. To this solution is added 240 parts of N,N-dimethylaniline and 167 parts of dichloromaleic anhydride. The mixture is stirred and heated at 70–80° C. for four hours. The reaction mixture turns dark with the formation of 2-cyano-3-(p-N,N-dimethylaminophenyl)maleic anhydride as a magenta dye.

The foregoing preparation is repeated using a molecular equivalent (250 parts) of mercuric cyanide in place of the silver cyanide. 2-cyano-3-(p-N,N-dimethylaminophenyl)maleic anhydride forms as a magenta dye.

EXAMPLE V

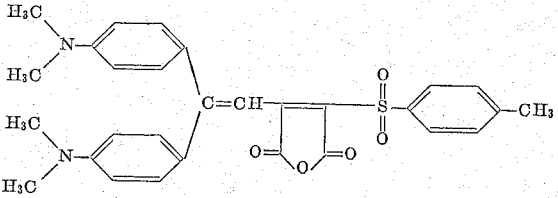

A solution of 266 parts of 1,1-bis(4-dimethylaminophenyl)ethylene and 167 parts of dichloromaleic anhydride is prepared in 9446 parts of dimethylformamide. This solution is cooled to room temperature and 178 parts of sodium-p-toluene-sulfinate added in small portions while stirring the mixture. The reaction mixture turns deep blue immediately. It is stirred for an additional five minutes at room temperature, then diluted with water and ice. The crude dye which precipitates is collected, washed with water, and dissolved in methylene chloride. The solution is dried, filtered, and concentrated to small volume. The concentrated solution is diluted with ether which causes crystallization of a red solid. This is collected and washed with ether and dried. This yields 45 parts of 2-[2,2-bis(p-N,N-dimethylaminophenyl)vinyl]-3-(p-tolylsulfonyl)maleic anhydride as a red dye having absorption maxima at 630, 634 millimicrons with molecular extinction coefficients of 40,700 and 17,500, respectively.

*Analysis.*—Calcd. for $C_{29}H_{28}O_5N_2S$: C, 67.40; H, 5.47; N, 5.43. Found: C, 66.30; H, 5.56; N, 5.29.

EXAMPLE VI

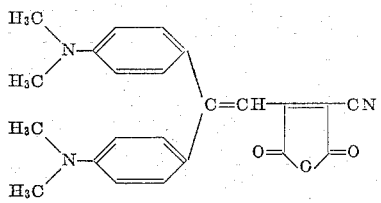

A solution of 8 parts of 1,1-bis(4-dimethylaminophenyl)ethylene in 945 parts of dimethylformamide is treated in turn with 5 parts of dichloromaleic anhydride and 15 parts of sodium cyanide. The reaction mixture takes on a deep blue color. The reaction mixture is precipitated in a water and ice mixture and the dye collected on a filter. This yields 2-[2,2-bis(p-N,N-dimethylaminophenyl)vinyl]-3-cyanomaleic anhydride as a deep blue-magenta dye having an absorption maximum at 570 millimicrons.

EXAMPLE VII

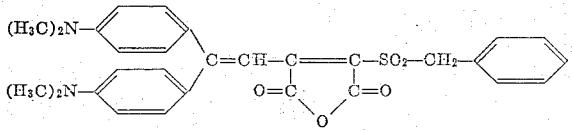

To a suspension of 266 parts of 1,1-bis(p-dimethylaminophenyl)ethylene in 9450 parts of dimethylformamide is added 167 parts of dischloromaleic anhydride and 180 parts of sodium benzylsulfinate at 25–30° C. After stirring for 15 minutes at 25–30° C., the resulting deep blue solution is diluted rapidly with a mixture of ice and water. The crude dye which precipitates is collected, washed, with water, and dissolved in methylene chloride. The solution is dried, filtered, and concentrated to a small volume. The concentrated solution is diluted with ether, whereupon bronze crystals separate. These are collected, washed with ether, and dried. This yields 210 parts of 2-[2,2-bis(p-N,N-dimethylaminophenyl)vinyl]-3-benzylsulfonyl)maleic anhydride as bronze crystals melting at 164–166° C. This dye has absorption maxima at 620, 333, and 263 millimicrons with molecular extinction coefficients of 42,000, 15,100, and 12,300 respectively.

*Analysis.*—Calcd. for $C_{29}H_{26}O_5N_2S \cdot \frac{1}{4}HCl$: C, 66.23; H, 5.41; N, 5.3. Found: C, 65.90; H, 5.62; N, 4.9.

EXAMPLE VIII

The procedure of Example VII is repeated except that an equivalent amount of sodium methanesulfinate is used in place of sodium benzylsulfinate. The product obtained is 2-[2,2-bis(p-N,N-dimethylaminophenyl)vinyl]-3-(methanesulfonyl)-maleic anhydride, which has an absorption maximum at 595 millimicrons.

EXAMPLE IX

The procedure of Example VII is repeated except that an equivalent amount of sodium 1-butanesulfinate is used in place of sodium benzylsulfinate. The product obtained is 2-[2,2-bis(p-N,N-dimethylaminophenyl)vinyl]-3-(1-butanesulfonyl)-maleic anhydride, which has an absorption maximum of 600 millimicrons.

EXAMPLE X

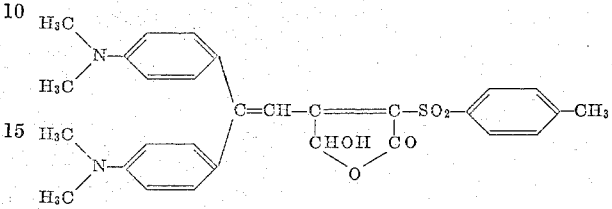

A mixture of 266 parts of 1,1-bis(N,N-dimethylaminophenyl)ethylene, 242 parts of mucobromic acid, 180 parts of sodium p-toluenesulfinate, and 1890 parts of dimethylformamide is stirred at 50–60° C. for 30 minutes. The reaction mixture is diluted with ice and water and the resulting crude dye is collected by filtration, washed with water, taken up in methylene chloride, and dried. The solution is filtered from the drying agent and concentrated to a small volume. The addition of ether and methanol precipitates the dye in a black powder. Recrystallization from methylene chloride-ether-methanol mixture yields 200 parts of the lactone of 2-p-toluenesulfonyl-3-[2,2-bis(N,N-dimethylaminophenyl)vinyl]-3-formylacrylic acid as microscopic black crystals melting at 115–117° C. This dye has absorption maxima at 520, 430, and 225 millimicrons with molecular extinction coefficients of 12,400, 9,500, and 25,600, respectively. The compound dyes fibers of cellulose acetate, nylon, silk, wool, polyethylene terephthalate, and polyacrylonitrile shades of magenta.

*Analysis.*—Calcd. for $C_{29}H_{30}O_5N_2S$: C, 67.14; H, 5.83; N, 5.41. Found: C, 67.56; H, 6.11; N, 5.87.

EXAMPLE XI

The procedure of Example X is repeated except that an equivalent amount of sodium methanesulfinate is used in place of sodium p-toluenesulfinate. The product obtained is 2-methanesulfonyl-3-[2,2-bis(N,N-dimethylaminophenyl)-vinyl]-3-formylacrylic acid, which has an absorption maximum at 480 millimicrons.

EXAMPLE XII

The procedure of Example X is repeated except that an equivalent amount of sodium 1-butanesulfinate is used in place of sodium p-toluenesulfinate. The product obtained is 2-(1-butanesulfonyl)-3-[2,2-bis(N,N-dimethylaminophenyl)vinyl]-3-formylacrylic acid, which has an absorption maximum at 480 millimicrons.

EXAMPLE XIII

The procedure of Example X is repeated except that an equivalent amount of sodium benzylsulfinate is used in place of sodium p-toluenesulfinate. The product obtained is 2-(benzylsulfonyl)-3-[2,2-bis(N,N-dimethylaminophenyl)vinyl]-3-formylacrylic acid, which has an absorption maximum at 485 millimicrons.

EXAMPLE XIV

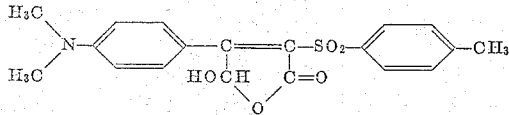

A mixture of 242 parts of mucobromic acid, 240 parts of N,N-dimethylaniline, 270 parts of sodium p-toluenesulfinate, and 1890 parts of dimethylformamide is stirred at 50–60° C. for 30 minutes. The reaction mixture is diluted with cold water and the resulting gummy precipitate is collected and is taken up in methylene chloride. The solution is dried, filtered from the drying agent, and concentrated to a small volume. The addition of methanol results in the crystallization of the dye as bright yellow crystals. Recrystallization from methylene chloride-methanol gives 30 parts of the lactone of 2-p-toluenesulfonyl-3 - (4 - N,N - dimethylaminophenyl) - 3 - formylacrylic acid as reddish orange crystals melting at 185–187° C. The compound dyes fibers of cellulose acetate, polyethylene terephthalate, and polyacrylonitrile shades of yellow; whereas, fibers of nylon, silk, and wool are dyed shades of brown. The dye has absorption maxima at 442 and 265 millimicrons with molecular extinction coefficients of 43,600 and 15,300, respectively.

EXAMPLE XV

The procedure of Example XIV is repeated except that an equivalent amount of sodium methanesulfinate is used in place of sodium p-toluenesulfinate. This yellow reaction mixture shows the formation of the lactone of 2-methanesulfonyl-3-(4-N,N-dimethylaminophenyl) - 3 - formylacrylic acid with an absorption maximum at 425 millimicrons.

EXAMPLE XVI

The procedure of Example XIV is repeated except that an equivalent amount of sodium 1-butanesulfinate is used in place of sodium p-toluenesulfinate. This yellow reaction mixture shows the formation of the lactone of 2-(1-butanesulfonyl) - 3 - (4 - N,N - dimethylaminophenyl) - 3-formylacrylic acid with an absorption maximum at 428 millimicrons.

EXAMPLE XVII

The procedure of Example XIV is repeated except that an equivalent amount of sodium benzylsulfinate is used in place of sodium p-toluenesulfinate. This yellow reaction mixture shows the formation of the lactone of 2-(benzylsulfonyl) - 3 - (4 - N,N-dimethylaminophenyl)-3-formylacrylic acid with an absorption maximum at 435 millimicrons.

The compounds of this invention may be synthesized by alternate means. For example, when diethyl oxalate reacts with diethyl malonate in the presence of sodium ethoxide, the triethyl ester of 2-oxo-1,1,2-ethanetricarboxylic acid is obtained. This is treated with oxalyl chloride which causes hydrolysis with ring closure and chloro substitution to yield 2-chloro-3-ethoxycarbonylmaleic anhydride.

In a similar series of steps diethyl oxalate and acetoacetic ester yield of 2-acetyl-3-oxo-1,4-butanedioic acid diethyl ester. Treatment of this with oxalyl chloride yields 2-acetyl-3-chloromaleic anhydride.

When the ethyl ester of malonic acid monoamide reacts with diethyl oxalate in the presence of sodium ethoxide, 2 - carbamyl-3-oxo-1,4-butanedioic acid diethyl ester is obtained. Treatment with oxalyl chloride yields 2-carbamyl-3-chloromaleic anhydride.

The ethyl ester of 2-thiocarbamoylacetic acid (reaction product of cyanoacetic ester and hydrogen sulfide) reacts with diethyl oxalate in the presence of sodium ethoxide to yield 2-oxo-3-thiocarbamoyl-1,4-butanedioic acid diethyl ester. Treatment of this compound with oxalyl chloride yields 2-chloro-3-thiocarbamoylmaleic anhydride.

Substituents in the 2-position of the lactones of the 3-substituted-3-formylacrylic acids corresponding to the full range indicated above for Y are obtained by suitable variations in processes indicated above. For example, sodium cyanide is used in place of sodium p-toluenesulfinate in the process of Example XIV to obtain the lactone of 3-[2,2 - bis(N,N - dimethylaminophenyl)vinyl] - 2 - cyano - 3-formylacrylic acid.

In a similar manner sodium nitrite is substituted for sodium p-toluenesulfinate in the process of Example XIV to obtain the lactone of 2-nitro-3-(p-N,N-dimethylaminophenyl)-3-formylacrylic acid.

The substituted 2-(or 3-)halogenomaleic anhydrides and the corresponding lactones of 3-halogeno-2-substituted-3-formylacrylic acids of this invention react with compounds QH to exchange Q for halogen and yield the corresponding Q derivatives of this invention. The following compounds in Table I are illustrative of compounds QH, and are therefore useful in preparing the corresponding Q— compounds of this invention. Beside each compound is indicated the position of the hydrogen atom removed in forming the Q— radical. When these compounds are substituted for the QH compounds in Examples I–XVII, the corresponding Q— derivatives are obtained.

*Table I*

| Color Former | Position of H in QH |
|---|---|
| Benzoylacetanilide | α |
| 3-methyl-1-phenyl-5-pyrazolone | 4 |
| Benzaldehyde phenylhydrazone | 4 (phenyl) |
| β-(N-ethylanilino)ethyltrimethylammonium chloride | p |
| Ethyl ester of benzoylacetic acid | α |
| N,N-diethyl-α-naphthylamine | 4 |
| N-(β-benzoyloxyethyl)-N-ethylaniline | 4 (anilino) |
| Malononitrile | 2 |
| N-methyl-N-β-cyanoethylaniline | p |
| Furylacrolein phenylhydrazone | 5 (furyl) |
| Pyrrole-2-aldehyde dimethylhydrazone | 5 (pyrryl) |
| Pyrrole | 2 |
| Resorcinol dimethyl ether | 4 |
| 2,6-dimethylphenol | 4 |
| Sodium salt of 1-naphthol-2-sulfonic acid | 4 |
| m-(1-hydroxy-2-naphthamido)benzaldehyde ethylene glycol acetal | 4 (naphthyl) |
| 2,6-dimethylaniline | 4 |
| N-n-Butylcarbazole | 3 |
| Phenol | 4 |

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Compounds of the formula

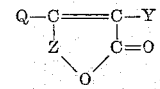

wherein Z is a member of the class consisting of

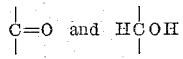

groups; Y is a member of the class consisting of —CN, —COOR, —COR, —CONR$_2$, —CSNR$_2$, —SO$_2$R and —NO$_2$ radicals; R is a member of the class consisting of hydrogen, alkyl of up to 20 carbon atoms, alkaryl of up to 20 carbon atoms, and aralkyl of up to 20 carbon atoms; and Q is selected from the class consisting of R′$_2$NAr—, RCONHNRAr—, RCH=NNRAr—,

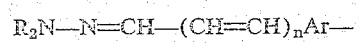

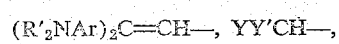

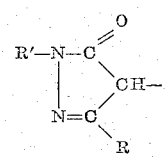

and

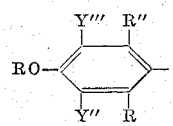

wherein Y and R are defined as above, Ar is arylene, R′ is a member of the class consisting of alkyl, β-alkoxyethyl, β-acyloxyethyl, α-cyanoethyl and β-trialkylammoniumethyl, Y″ is a member of the class consisting of alkyl, halogen, —SO₃Na and Y, Y‴ is a member of the group consisting of hydrogen and Y″, Y′ is defined the same as Y, R″ is defined the same as R with the proviso that Y‴ and R″ taken together can form another aryl ring, and n is a cardinal number of from 0 to 1, inclusive.

2. Process for preparing compounds of the formula

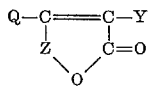

wherein Z is a member of the class consisting of

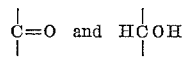

groups; Y is a member of the class consisting of —CN, —COOR, —COR, —CONR₂, —CSNR₂, —SO₂R and —NO₂ radicals; R is a member of the class consisting of hydrogen, alkyl of up to 20 carbon atoms, alkaryl of up to 20 carbon atoms, and aralkyl of up to 20 carbon atoms; and Q is selected from the class consisting of R′₂NAr—, RCONHNRAr, RCH=NNRAr—, R₂N—N=CH—(CH=CH)ₙAr—

(R′₂NAr)₂C=CH—, YY′CH—,

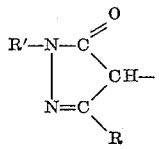

and

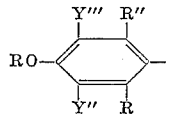

wherein Y and R are defined as above, Ar is arylene, R′ is a member of the class consisting of alkyl, β-alkoxyethyl, β-acyloxyethyl, α-cyanoethyl and β-trialkylammoniumethyl, Y″ is a member of the class consisting of alkyl, halogen, —SO₃Na and Y, Y‴ is a member of the group consisting of hydrogen and Y″, Y′ is defined the same as Y, R″ is defined the same as R with the proviso that Y‴ and R″ taken together can form another aryl ring, and n is a cardinal number of from 0 to 1, inclusive, which comprises reacting a compound of the formula

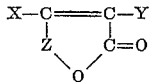

wherein Y and Z have the same significance as above and X represents halogen, with a compound of the formula

QH wherein Q has the same significance as above.

3. 2 - (p - N,N - dimethylaminophenyl) - 3 - (p - tolylsulfonyl)maleic anhydride.

4. 2 - (p - N,N - dimethylaminophenyl) - 3 - nitromaleic anhydride.

5. Lactone of 2 - p - toluenesulfonyl-3-[2,2-bis-(N,N-dimethylaminophenyl)vinyl]-3-formylacrylic acid.

6. Lactone of 2-p-toluenesulfonyl-3-(4-N,N-dimethylaminophenyl)-3-formylacrylic acid.

7. 2 - (2 - methylene - 1,3,3 - trimethylindolin - 5 - yl)-3-(p-tolylsulfonyl)maleic anhydride.

8. Process for preparing compounds of the formula

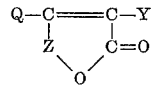

wherein Z is a member of the class consisting of

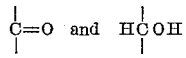

groups; Y is a member of the class consisting of —CN, —SO₂R, —COOR, —COR, CONR₂, —CSNR₂, and —NO₂ radicals; R is a member of the class consisting of hydrogen, alkyl of up to 20 carbon atoms, alkaryl of up to 20 carbon atoms, and aralkyl of up to 20 carbon atoms; and Q is selected from the class consisting of R′₂NAr—, RCONHNRAr—, RCH=NNRAr—, R₂N—N=CH—(CH=CH)ₙAr—

(R′₂NAr)₂C=CH—, YY′CH—,

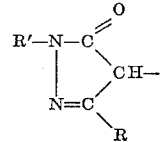

and

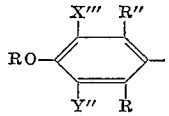

wherein Y and R are defined as above, Ar is arylene, R′ is a member of the class consisting of alkyl, β-alkoxyethyl, β-acyloxyethyl, α-cyanoethyl and β-trialkylammoniumethyl, Y″ is a member of the class consisting of alkyl, halogen, —SO₃Na and Y, Y‴ is a member of the group consisting of hydrogen and Y″, Y′ is defined the same as Y, R″ is defined the same as R with the proviso that Y‴ and R″ taken together can form another aryl ring, and n is a cardinal number of from 0 to 1, inclusive, which comprises reacting a compound of the formula

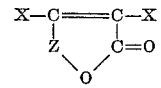

wherein Z has the same significance as above and X represents halogen, with MY and a compound of the formula

QH wherein M is a metal, and Q and Y have the same significance as above, at a temperature of from 0° to 200° C., and isolating the resulting product.

References Cited in the file of this patent

Adams et al.: Organic Reactions, volume II, pages 224–238, 246–247 (1944).

Bergmann: The Chemistry of Acetylene and Related Compounds, page 80, Interscience Publishers Inc., New York (1948).

Randestvedt et al.: J. Org. Chem., volume 19, pages 119–128 (1954).